United States Patent
Plate et al.

(10) Patent No.: US 9,792,200 B2
(45) Date of Patent: Oct. 17, 2017

(54) ASSESSING VULNERABILITY IMPACT USING CALL GRAPHS

(71) Applicant: SAP SE, Walldorf (DE)

(72) Inventors: Henrik Plate, Valbonne (FR); Serena Ponta, Antibes (FR); Antonino Sabetta, Mouans Sartoux (FR)

(73) Assignee: SAP SE, Walldorf (DE)

( * ) Notice: Subject to any disclaimer, the term of this patent is extended or adjusted under 35 U.S.C. 154(b) by 115 days.

(21) Appl. No.: 15/057,812

(22) Filed: Mar. 1, 2016

(65) Prior Publication Data

US 2017/0255544 A1    Sep. 7, 2017

(51) Int. Cl.
| | |
|---|---|
| G06F 9/44 | (2006.01) |
| G06F 11/36 | (2006.01) |
| G06F 21/57 | (2013.01) |

(52) U.S. Cl.
CPC ...... *G06F 11/3636* (2013.01); *G06F 11/3624* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 7,284,274 B1 * | 10/2007 | Walls ................... | G06F 8/70 726/22 |
| 8,726,151 B2 | 5/2014 | Rahaman et al. | |
| 8,782,603 B2 | 7/2014 | Plate | |
| 8,819,131 B2 | 8/2014 | Hebert et al. | |
| 8,955,115 B2 | 2/2015 | Sabetta et al. | |
| 9,009,534 B2 | 4/2015 | Plate et al. | |
| 9,405,906 B1 * | 8/2016 | Sheth ................... | G06F 21/565 |
| 2015/0007138 A1 | 1/2015 | Sabetta | |
| 2015/0007249 A1 | 1/2015 | Bezzi et al. | |
| 2015/0242515 A1 | 8/2015 | Trabelsi et al. | |

(Continued)

OTHER PUBLICATIONS

Williams, Jeff; The Unfortunate Reality of Insecure Libraries; <https://www.aspectsecurity.com/research-presentations/the-unfortunate-reality-of-insecure-libraries> [last visited Mar. 1, 2016 10:00:22 AM].

(Continued)

*Primary Examiner* — Philip Wang
(74) *Attorney, Agent, or Firm* — Fish & Richardson P.C.

(57) ABSTRACT

Implementations are directed to enhancing assessment of one or more known vulnerabilities inside one or more third-party libraries used within an application program that interacts with the one or more third-party libraries. In some examples, actions include receiving a complete call graph that is provided by static source code analysis (SSCA) of the application program and any third-party libraries used by the application, receiving one or more stack traces that are provided based on dynamic source code analysis (DSCA) during execution of the application program, processing the complete call graph, the one or more stack traces, and vulnerable function data to provide one or more combined call graphs, the vulnerable function data identifying one or more vulnerable functions included in the one or more third-party libraries, each combined call graph being specific to a respective vulnerable function, and providing a graphical representation of each combined call graph.

17 Claims, 5 Drawing Sheets

(56) References Cited

U.S. PATENT DOCUMENTS

| | | | | |
|---|---|---|---|---|
| 2015/0242636 A1* | 8/2015 | Khan | ..................... | G06F 21/577 726/25 |
| 2015/0302191 A1* | 10/2015 | Ueda | ....................... | G06F 21/50 726/22 |
| 2015/0309813 A1* | 10/2015 | Patel | ......................... | G06F 8/75 703/22 |

OTHER PUBLICATIONS

Wikipedia OWASP Dependency Check; <https://www.owasp.org/index.php/OWASP_Dependency_Check>; [last visitedMar. 1, 2016 10:01:35 AM].

Open Source Software Security—Vulnerability Manangement; <http://www.whitesourcesoftware.com/open-source-security-vulnerabilities>; /[last visited Mar. 1, 2016 10:02:12 AM].

IBM Application Security, Web and Mobile Application Vulnerability Protection; <http://www-03.ibm.com/software/products/en/category/application-security>; [last visited Mar. 1, 2016 10:02:44 AM].

Davide Balzarotti et al., "Saner: Composing Static and Dynamic Analysis to Validate Sanitization in Web Applications," in Proceedings of the 2008 IEEE Symposium on Security and Privacy, pp. 387-401, Washington, DC, USA, 2008. IEEE Computer Society.

Michael D Ernst, "Static and dynamic analysis: synergy and duality," in: Proceedings of the ICSE Workshop on Dynamic Analysis (WODA 2003). Citeseer. 2003, pp. 24-27.

Yao-Wen Huang et al., "Securing Web Application Code by Static Analysis and Runtime Protection," in WWW '04: Proceedings of the 13th international conference on World Wide Web, pp. 40-52, New York, NY, USA, May 17-22, 2004, ACM.

Simon Holm Jensen et al., "Type Analysis for JavaScript," in: Proc. 16th International Static Analysis Symposium (SAS). vol. 5673. LNCS. Springer-Verlag, 2009, 18 pages.

Matias Madou et al., "Watch What You Write: Preventing Cross-Site Scripting by Observing Program Output," in: OWASP AppSec 2008 Conference (AppSecEU08), May 2008, 14 pages.

Markus Mock, "Dynamic Analysis from the Bottom Up," in: Proceedings of the ICSE Workshop on Dynamic Analysis (WODA 2003). Citeseer, 2003, pp. 13-16.

Sooel Son, et al., "The Postman Always Rings Twice: Attacking and Defending postMessage in HTML5 Websites," in: Network and Distributed System Security Symposium (NDSS'13), 2013, 14 pages.

Zacharias Tzermias et al., "Combining Static and Dynamic Analysis for the Detection of Malicious Documents," in: Proceedings of the Fourth European Workshop on System Security. ACM. 2011, 6 pages.

'jslint.com' [online]. Crockford, "JSLint, the JavaScript Code Quality Tool," 2002, [retrieved on Mar. 24, 2015]. Retrieved from the internet: URL<http://www.jslint.com/>. 2 pages.

'JSPrime.com' [online]. Nishant Das Patnaik and Sarathi Sabyasachi Sahoo, JSPrime, a javascript static security analysis tool, 2013, [retrieved on Mar. 24, 2015]. Retrieved from the internet: URLhttp://dpnishant.github.io/jsprime/. 2 pages.

* cited by examiner

ASSESSING VULNERABILITY IMPACT USING CALL GRAPHS

BACKGROUND

Studies have shown that developers of software applications heavily rely on the use of third-party libraries. In some cases, the number of third-party libraries can number in the hundreds, for example. However, a security vulnerability in any of the libraries used by an application may compromise the security of the entire application. In some examples, if a vulnerability is detected, a patch can be developed and deployed to mitigate the risk that such a vulnerability poses.

In order to determine the actual impact of a vulnerability of a library on a given application, application and security experts analyze every third-party library vulnerability in detail. This impact assessment, however, is complicated by a number a factors such as, for example, short and incomprehensible vulnerability descriptions, or the fact that dependencies on third-party libraries can be transitive (rather than direct).

Such difficulties can result in inaccurate impact assessments such as, for example, false-negatives and false-positives. False-positives are cases in which experts wrongly judge that a vulnerability impacts the application. Consequently, false-positives represent wasted effort related to the development and deployment of (unnecessary) patches. False-negatives are cases in which experts wrongly judge that a vulnerability does not impact the application. As a result, application deployments will not be fixed, but remain exposed to attacks exploiting the vulnerability.

SUMMARY

Implementations of the present disclosure are directed to assessing vulnerability of computer-executable code using call graphs. More particularly, implementations of the present disclosure are directed to enhancing assessment of one or more known vulnerabilities inside one or more third-party libraries used within an application program that interacts with the one or more third-party libraries. In some examples, actions include receiving a complete call graph that is provided by static source code analysis (SSCA) of the application program and any third-party libraries used by the application, receiving one or more stack traces that are provided based on dynamic source code analysis (DSCA) during execution of the application program, processing the complete call graph, the one or more stack traces, and vulnerable function data to provide one or more combined call graphs, the vulnerable function data identifying one or more vulnerable functions included in the one or more third-party libraries, each combined call graph being specific to a respective vulnerable function, and providing a graphical representation of each combined call graph. Other implementations of this aspect include corresponding systems, apparatus, and computer programs, configured to perform the actions of the methods, encoded on computer storage devices.

These and other implementations can each optionally include one or more of the following features: processing the complete call graph, the one or more stack traces, and vulnerable function data to provide one or more combined call graphs, includes: determining a unique identifier assigned to a vulnerable function from the vulnerable function data, providing a sub-call graph based on the unique identifier at least in part by searching from a node representing the vulnerable function backward within the complete call graph to identify one or more nodes representing functions of one or more of the third-party libraries and the application program to provide a sub-set of nodes from the complete call graph, the sub-set of nodes and relations between nodes defining the sub-call graph, identifying a stack trace associated with the unique identifier, and merging the stack trace with the sub-call graph to provide a combined call graph for the vulnerable function; each combined call graph includes nodes and edges between nodes, at least one edge representing at least a portion of a stack trace and connecting a node representing a vulnerable function with a node representing a function; at least one node of the combined call graph represents one of a function, a package, and a file; each combined call graph includes one or more annotations, at least one annotation indicating a name of one of a respective function and a respective package; at least one annotation indicates a metric determined for one of a respective function and a respective package; and actions further include providing at least one metric based on information from one or more of SSCA and DSCA, and processing the metric based on a policy to selectively trigger an action provided in the policy.

Implementations of the present disclosure provide one or more advantages. For example, an accurate assessment of the relevance and criticality of vulnerabilities affecting third-party libraries in a given application context is provided, which supports the prioritization of issues and the planning of mitigation measures. The assessment on the level of source code functions also supports the development of proof of concept exploits of the respective vulnerabilities. Moreover, the detailed information about potential and actual execution paths facilitates software architecture and design decisions on where to implement counter measures. Ultimately, implementations of the present disclosure mitigate vulnerabilities in the application program to provide a more secure application program.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to assessing vulnerability of computer source code using call graphs. More particularly, implementations of the present disclosure are directed to assessing whether vulnerable code in third-party libraries can be reached from application code. In some implementations, combined call graphs are provided, which represent both the actual and the potential invocation of functions in the context of a computer-executable application. In some implementations, each combined call graph is annotated and provides different analysis views that differ in terms of granularity. The combined call graphs of the present disclosure facilitate and enhance analysis of third-party vulnerabilities, and reduce the rates of false-positives and false-negatives.

In accordance with implementations of the present disclosure, and as described in further detail herein, a combined call graph is provided using stack traces, and the source code of the application. In some examples, the stack traces represent sequences of actual invocations of functions that occur during application execution. Stack traces can be collected by executing the application in a test systems, and/or in a production system. In some examples, stack traces are provided as a result of dynamic source code analysis (DSCA), which is a technique that dynamically analyzes program source code, while the source code is executing (running).

With regard to the source code, different source code analysis techniques can be used to provide potential invocations of functions that could occur during the course of a program's execution, and can be provided in the form of call graphs. In some examples, call graphs can be provided as a result of static source code analysis (SSCA), which is a technique that statically analyzes program source code to detect problems within the source code. That is, SSCA performs such analysis without actually executing (running) the source code.

In accordance with implementations of the present disclosure, and as described in further detail herein, a combined call graph is provided for each function in question based on a call graph provided from SSCA, and a stack trace from DSCA. In some examples, a function in question is a function that is provided as part of a third-party library, that is determined to have a vulnerability, and that is to be analyzed to assess an impact of the function on the application, into which it is incorporated. In some implementations, the combined call graph and associated information provide detailed, code-level information to security experts helping to assess the impact of a given vulnerable function on a given application.

In some examples, a call graph is a directed graph that represents calling relationships between functions in a computer program. In some examples, a static call graph represents potential invocations of functions, and can be provided from SSCA. In some examples, a dynamic call graph, also referred to herein as a stack trace, represents actual function invocations observed during execution of a program execution.

In accordance with implementations of the present disclosure, and as described in further detail herein, a combined call graph is provided by merging a static call graph and a dynamic call graph (stack trace), and by reduction to sub-graphs that relate to the execution of respective, vulnerable functions (e.g., open-source functions). In some implementations, graph visualization is provided and supports different granularities. In some implementations, one or more risk metrics are determined, which allow for automated application of one or more policies.

Figure 1:
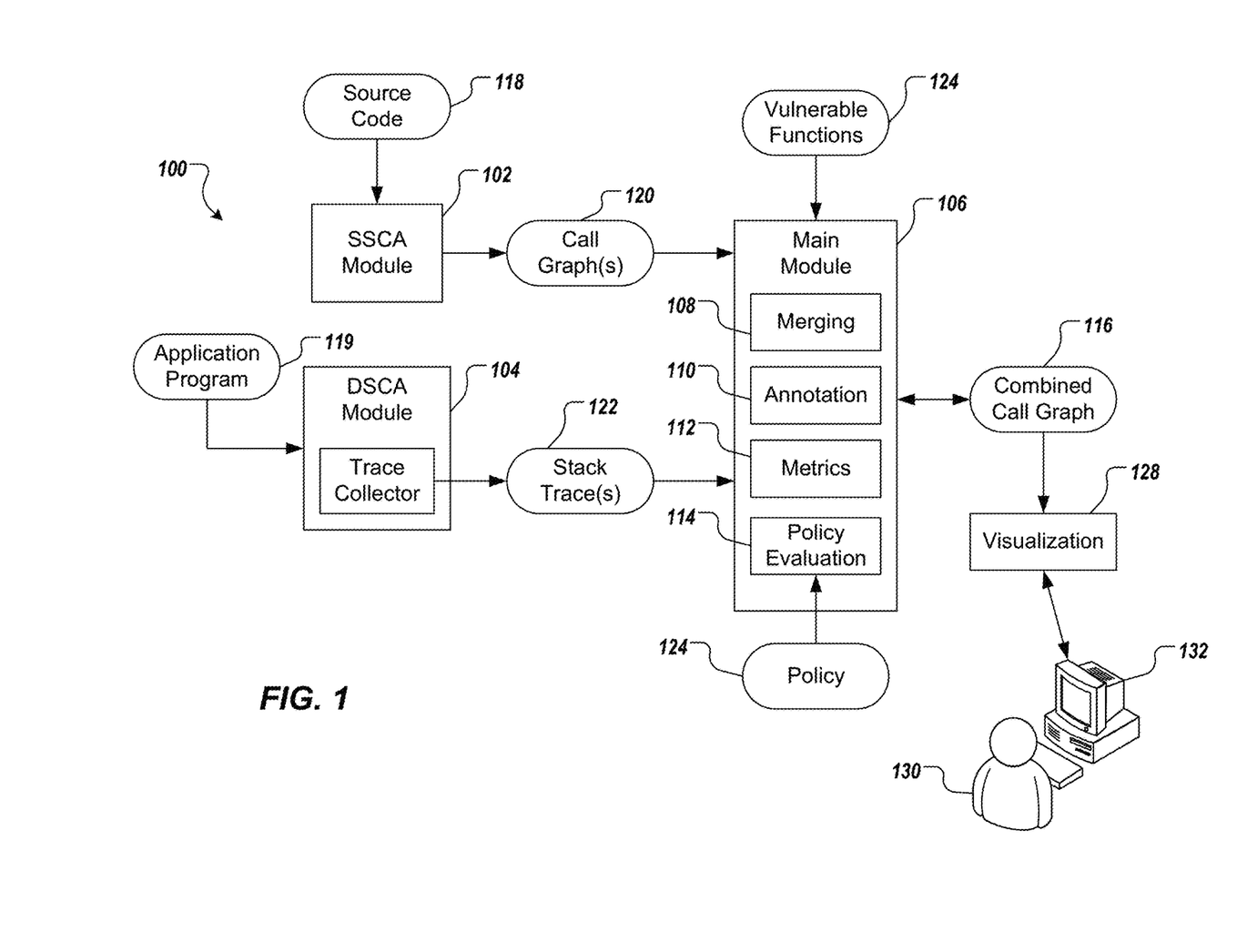
FIG. 1 depicts an example system architecture for executing implementations of the present disclosure.

FIG. 1 depicts an example system architecture 100 for executing implementations of the present disclosure. In the depicted example, the system architecture 100 includes a SSCA module 102, a DSCA module 104, and a main module 106, which includes a merging sub-module 108, an annotation sub-module 110, a metrics sub-module 112, and a policy evaluation sub-module 114. The example system architecture 100 also includes a visualization module 116. In some examples, each module and/or sub-module is provided as one or more computer-executable applications executed by one or more computing devices.

In some implementations, the SSCA module 102 processes source code 118 to provide one or more call graphs 120 (static call graphs), and the DSCA module 104 executes the application 119 (e.g., a compiled, binary program from the source code 118) to provide one or more stack traces 122 (dynamic call graphs). Both SSCA and DSCA also includes the third-party libraries implicated. For example, call graphs provided from the SSCA includes representations of calls to third-party libraries, and stack traces provided from the DSCA includes representations of calls to third-party libraries. In some examples, the source code 118 is provided in one or more computer-readable files. In some implementations, the source code 118 is provided in a human-/machine-readable programming language (e.g., decompiled source code). In some implementations, the source code 118 is provided as machine-readable code (binary code) (e.g., compiled code). In some examples, each of the call graphs 120 and the stack traces 122 are provided as computer-readable files.

In some implementations, the main module 106 processes the call graphs 120, the stack traces 122, and vulnerable function data 124 to provide one or more combined call graphs 126. In some examples, the vulnerable function data 124 is provided in one or more computer-readable files, and can include an inventory of known, vulnerable functions provided in one or more libraries. In some examples, a vulnerable function is a function that is vulnerable to, or the use of the function can result in a security vulnerability. In some examples, the vulnerable function data 124 is provided from a source of vulnerable function information (e.g., published security patches, debugging tools).

In some implementations, the SSCA module 102 and the DSCA module 104 each receive the vulnerable function data 124, and only provide output based on the functions identified in the vulnerable function data 124. For example, the SSCA module 102 can process the source code 118 in view of the vulnerable function data 124 to provide the call graphs 120 for only those functions identified in the vulnerable function data 124 (as opposed to call graphs for all functions in the source code 118). As another example, the DSCA module 104 can process the application program 119 in view of the vulnerable function data 124 to provide the stack traces 122 for only those functions identified in the vulnerable function data 124 (as opposed to stack traces for all functions executed during execution of the application program 119).

In some implementations, the merging sub-module 108 merges the call graph and stack trace for a respective function to provide a combined call graph for the function. In some implementations, the annotation sub-module 110 provides annotations to the combined call graph. For example, each node in the call graph can be annotated with the name of the function that the node represents, or package that the node represents, depending on the granularity of the combined call graph (e.g., function-level granularity, package-level granularity, deployment unit or file granularity). In some implementations, the metrics sub-module 112 determines one or more metrics that indicate a risk that a respective vulnerability can be exploited. In some examples, a metric is determined based on one or more parameters, as described in further detail herein. In some implementations, the policy evaluation sub-module 114 performs policy evaluation based on the combined call graph, and one or more policies 124. In some examples, and as described in further detail herein, the policy evaluation sub-module 114 automatically issues one or more actions in response to one or more conditions formulated over the combined call graph being holding (e.g., true, false).

In the depicted example, the system architecture 100 includes a visualization module 128. In some examples, the visualization module 128 provides one or more visualizations 128 of combined call graphs 116. For example, a user 130 (e.g., security expert) can use a computing device 132 to view one or more visualizations provided from the visualization module 128. Example visualizations, discussed in further detail herein, can include graphs and tables.

In some implementations, the system architecture 100 can be provided by (locally executed by) the computing device 132. In some implementations, the system architecture 100 can be provided by one or more remote computing devices (e.g., servers) that communicate with the computing device 132 (e.g., over a network).

Implementations of the present disclosure will be described in further detail with reference to an example programming language. The example programming language includes the Java programming language. It is contemplated, however, that implementations of the present disclosure are applicable to any appropriate programming language.

As introduced above, implementations of the present disclosure are directed to providing a combined call graph for a respective function (vulnerable function) based on SSCA and DSCA, and using the combined call graph to assess vulnerability of an application. In some examples, SSCA takes source code of an application as input, as well as that of all third-party libraries. In some examples, intermediate or binary representations of the source code can be provided as input to the SSCA (e.g., provided that the particular SSCA analyzer is able to inspect program control and data flows). In general, such SSCA analyses can be referred to as "whole-program" analyses, due to the fact that they consider both application and third-party library code. In some examples, a complete call graph (static call graph) is provided from the SSCA analysis, the complete call graph starting from the application functions. In other words, the complete call graph contains all functions (including functions of the third-party libraries) that can be potentially reached from the application functions. In some examples, the complete call graph is over-approximated (i.e., some of the potential calls identified during the analysis cannot happen during real program execution).

The complete call graph is processed to provide one or more sub-call graphs. In some examples, the complete call graph is processed to remove any nodes, whose execution will never lead to the execution of vulnerable open-source functions. Accordingly, vulnerable function data is provided, which indicates which vulnerable functions could be included as nodes in the complete call graph. In some examples, sub-call graphs are provided by searching backwards starting from each vulnerable function (e.g., determining that a node represents a vulnerable function based on the vulnerable function data, and search the complete call graph backwards from that node). In some examples, processing a complete call graph to provide one or more sub-call graphs is performed by the main module 106 of FIG. 1.

In some implementations, DSCA occurs independently from SSCA. In some examples, the DSCA receives the vulnerable function data, and the executable application program as input. During execution of the program (e.g., as part of application testing), stack traces are collected whenever one of the vulnerable source functions is executed. In some examples, a stack trace is provided as a sequence of calls that led to the execution of a given (vulnerable) function. The manner, in which stack traces are collected can depend on the programming language and execution environment of the application program under analysis. In the example of the Java programming language, the application and third-party library code could be dynamically modified during the class-loading process of the Java Runtime Environment (JRE). In another example, the trace collection can be realized using aspect oriented programming techniques.

In some implementations, besides collecting only stack traces for vulnerable functions, other information that may be useful for later analysis can be collected. For example, the actual parameters passed between function calls, and/or the number of actual invocations can be collected as part of the DSCA.

In some implementations, and as described herein, the stack traces and the reduced call graph for a given vulnerable function are merged to provide a combined call graph for the respective vulnerable function (e.g., by the merge sub-module 108 of FIG. 1). Accordingly, if the third-party libraries include a plurality of vulnerable functions, a combined call graph is provided for each vulnerable function. In some examples, a merge criterion is provided as a unique function identifier within the respective execution environment. In the Java programming language, for example, the fully qualified name of a Java class method can be used as the unique identifier. In some examples, the fully qualified name of a Java class method includes the Java package name, the Java class name, the method name, and all of the parameter types that the method takes as arguments.

In some implementations, the combined call graph can be annotated (e.g., by the annotation sub-module 110 of FIG. 1). For example, information collected during SSCA and/or DSCA can be added as annotations to the graph nodes of a combined call graph. Example information and annotations can include date/time of the actual function invocation observed during DSCA, the number of actual function invocations, the file name and file system location of the archive or executable, from which a function was loaded (e.g., the Java archive), structural information from the source code (e.g., package or class information), annotations from the source code (e.g., test case identifiers), and other context information observed during dynamic analysis (e.g., operating system, tester, etc.).

In some implementations, metrics can be determined (e.g., by the metrics sub-module 112 of FIG. 1), each metric indicating a risk that a respective vulnerable function can be exploited in the specific application context. In some examples, a metric can be determined based on the number of vulnerable functions actually invoked compared to the overall number of vulnerable functions related to the respective vulnerability, the number of different application functions that can lead to the execution of vulnerable functions, and/or the distance between invoked functions and vulnerable functions (which is particularly useful in case the vulnerable function itself has not been executed, e.g., due to test coverage problems).

In some implementations, a combined call graph is provided as output (e.g., from the main module 106 of FIG. 1) for each vulnerable function. In some examples, the combined call graph includes annotations and/or metrics associated therewith. The combined call graph supports assessment of whether a respective vulnerability is indeed exploitable in the specific application context. In some examples, the inclusion of annotations enables different views on the combined call graph to be provided. More particularly, the combined call graph can be depicted at different granularities, as described in further detail below with reference to FIGS. 2 and 3.

In some implementations, different types of visualizations of the combined call graph can be provided. In some examples, the combined call graph can be depicted in graph form including nodes and edges between nodes (e.g., as provided in FIGS. 2 and 3, discussed below). In some examples, the combined call graph can be depicted in tabular form (e.g., as a table). In some examples, in a tabular view of the call graph, table rows can represent the vulnerable functions, and columns can represent information relevant to the vulnerable functions. Example columns can include "Type," which indicates whether a function is of type "Java method" or "Java constructor," for example, "Reachable," which indicates whether individual vulnerable functions can be reached from application functions, and, if yes, from which application "entry point" and the related call distance (e.g., number of calls from an application function to the vulnerable function), and "Traced," which indicates whether the execution of a vulnerable function has been observed, and, if yes, at what time and how often.

Figure 2:
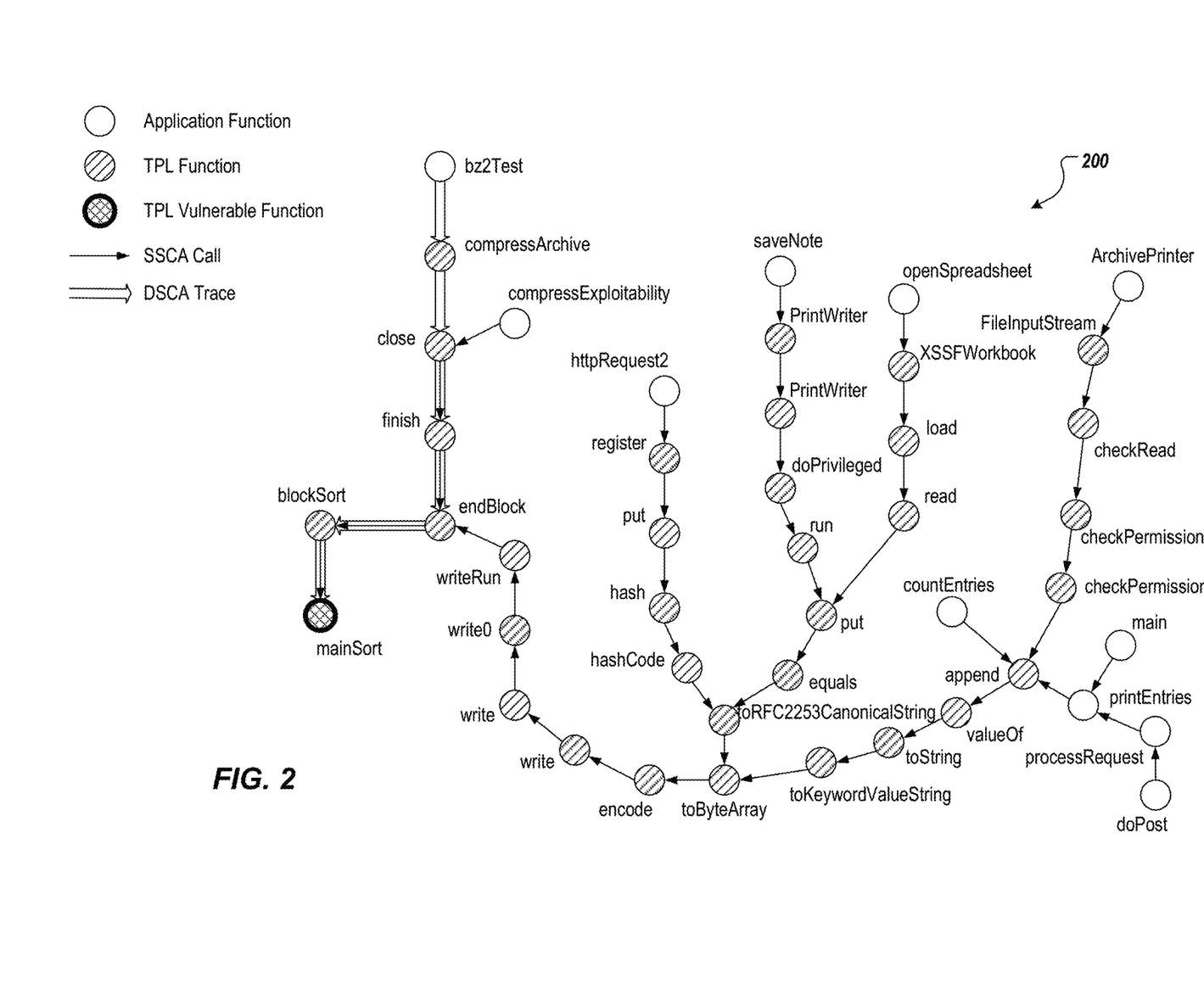
FIG. 2 depicts an example combined call graph for a particular function at a first granularity in accordance with implementations of the present disclosure.

FIG. 2 depicts an example combined call graph 200 for a particular function at a first granularity in accordance with implementations of the present disclosure. The combined call graph 200 of FIG. 2 is depicted at the function-level (first granularity), where nodes represent functions, and edges represent calls between functions. FIG. 2 provide a legend depicting different types of nodes, which include, for example, nodes that represent functions that are part of the application under analysis, nodes that represent functions that are part of third-party libraries, and a node that represents the vulnerable function, to which the combined graph is directed. The legend also identifies different types of edges, which include possible calls between functions (e.g., from call graphs), and actual calls between functions observed during execution of the application (e.g., from stack traces). The example of FIG. 2 shows that the vulnerable method "mainSort" can be potentially invoked from the application functions "saveNote," and "openSpreadsheet" among others, and that the actual invocation of "mainSort" was observed during the execution of the test case "bz2Test." The example of FIG. 2 highlights an advantage of implementations of the present disclosure, in that SSCA does not reveal a call progression from "bz2Test," to "compressArchive," to "close," and ultimately to "mainSort" (as indicated by an absence of edges between "bz2Test" and "compressArchive," and "compressArchive" and "close"). However, the DSCA reveals a stack trace from "bz2Test" to "mainSort."

Figure 3:
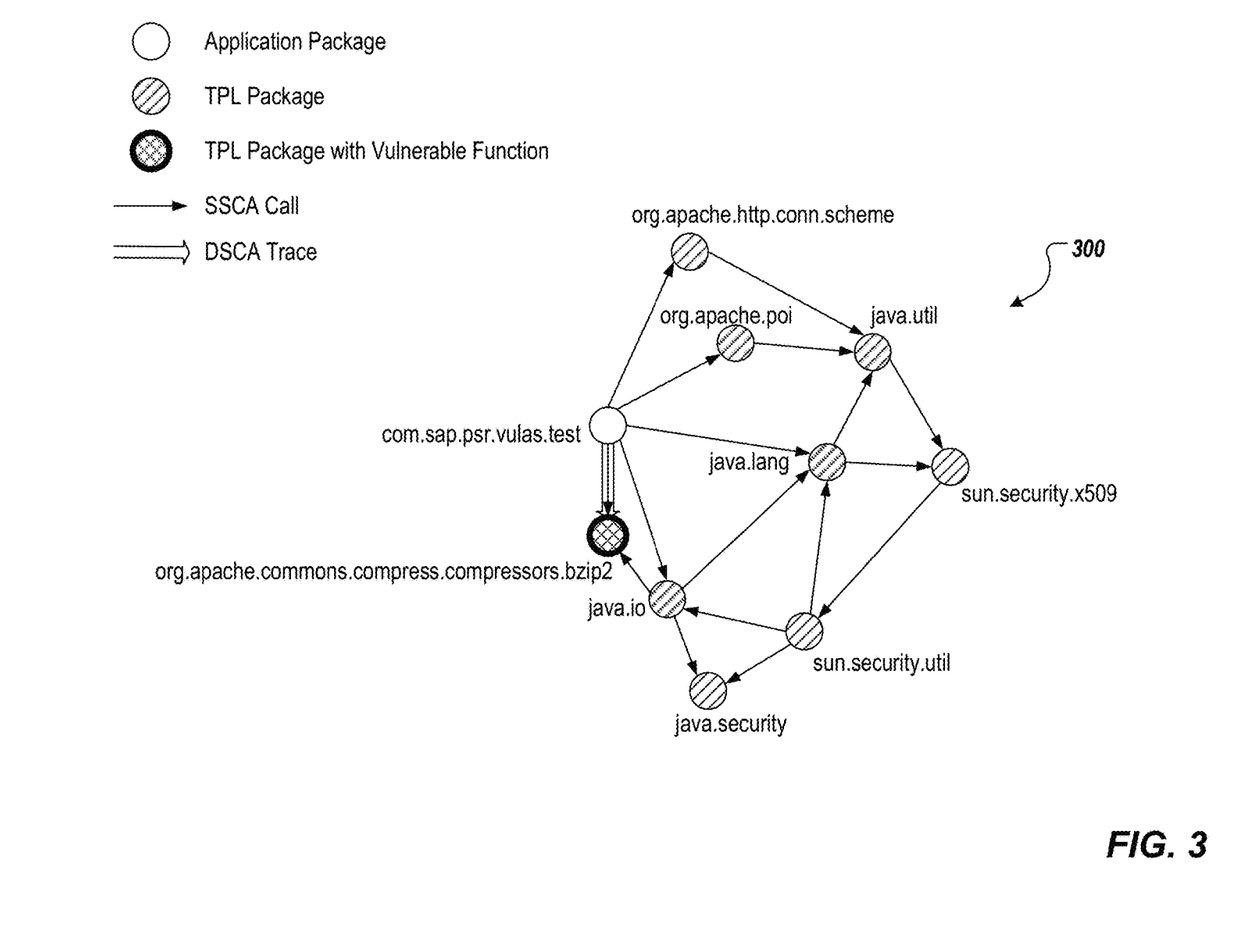
FIG. 3 depicts an example combined call graph for the particular function at a second granularity in accordance with implementations of the present disclosure.

FIG. 3 depicts an example combined call graph 300 for the particular function at a second granularity in accordance with implementations of the present disclosure. The combined call graph 300 of FIG. 3 is depicted at the package-level (second granularity), where nodes represent packages (of functions), and edges represent calls between packages.

As noted above, the combined call graphs can be processed in view of one or more policies, and one or more actions can be automatically initiated. In some examples, a policy provides one or more conditions that, if met, trigger an action (or actions). Example conditions can include: all vulnerable functions related to a given vulnerability have been actually executed, or, if no vulnerable functions have been executed, the smallest call distance between an application function and a vulnerable function is below a certain threshold. Example actions triggered by the policy evaluation can include interrupting periodic build processes, and/or the sending an alert.

Figure 4:
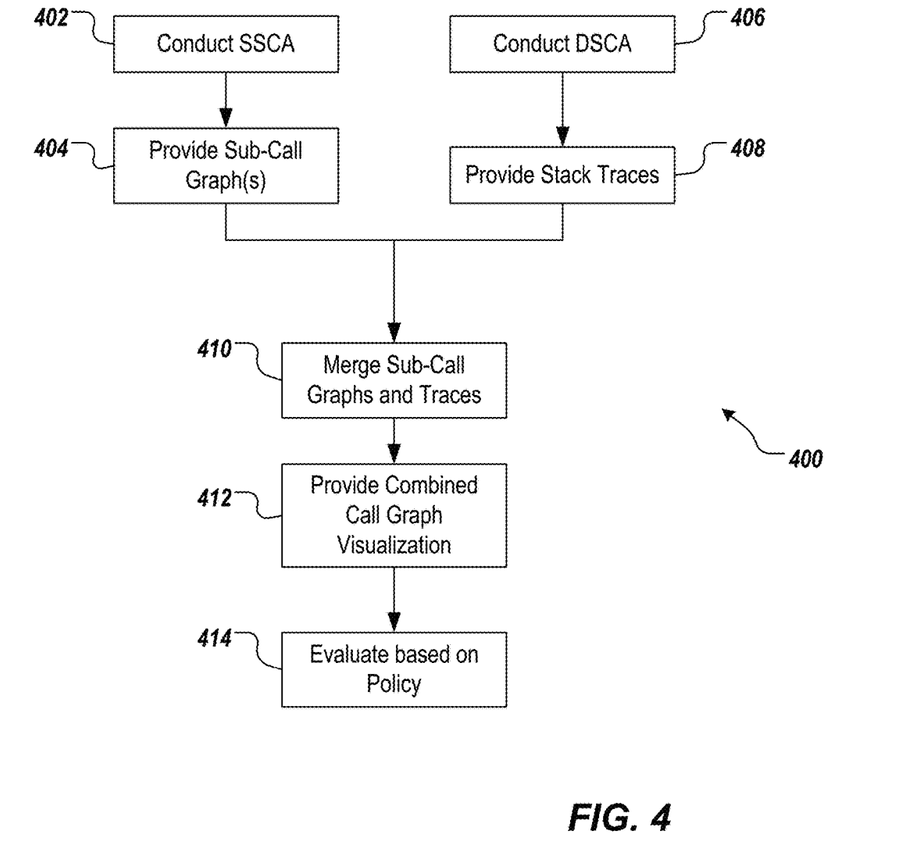
FIG. 4 is a flowchart illustrating an example process that can be executed in implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices. In some examples, the example process 400 is performed to provide one or more combined call graphs in accordance with implementations of the present disclosure.

SSCA is conducted (402). For example, a SSCA module (e.g., the SSCA module 102 of FIG. 1) processes source code of the application and one or more third-party libraries used by the application (e.g., provided in a computer-readable files), to provide a complete call graph. For example, and as discussed above, the complete call graph contains all functions (including functions of the third-party libraries) that can be potentially reached from the application functions. One or more sub-graphs are provided (404). For example, a module (e.g., the SSCA module 102, the main module 106 of FIG. 1) can process the complete call graph and vulnerable function data to provide the one or more sub-call graphs, and transmit the one or more sub-call graphs to another module for merging (e.g., the main module 106 of FIG. 1). For example, and as described herein, the complete call graph can be processed to remove any nodes, whose execution will never lead to the execution of vulnerable functions in the third-party libraries. In some examples, sub-call graphs are provided by searching backwards starting from each vulnerable function (e.g., determining that a node represents a vulnerable function based on the vulnerable function data, and search the complete call graph backwards from that node).

DSCA is conducted (406). For example, a DSCA module (e.g., the DSCA module 104 of FIG. 1) executes the application in hand with the one or more third-party libraries used by the application to provide stack traces (408) (e.g., to the main module 106 of FIG. 1). As discussed herein, the stack traces represent sequences of actual invocations of functions that occur during application execution. In some examples, the DSCA can be conducted concurrently with the SSCA. In some examples, the DSCA and the SSCA can be conducted at different times.

The sub-call graphs and respective stack traces are merged (410). For example, a merging module (e.g., the merging sub-module 108 of FIG. 1) associates a sub-call graph to a respective stack trace based on unique identifiers assigned to one or more functions, and merges the associated sub-call graph and stack trace to provide a combined call graph. In some examples, multiple combined call graphs are provided, each combined call graph being representative of a respective vulnerable function. One or more combined call graph visualizations are provided (412). For example, and as described herein, graphical and/or tabular visualizations of combined call graphs at different levels of granularity can be provided (e.g., as depicted in FIGS. 2 and 3). Combined call graphs can be evaluated based on one or more policies (414). For example, and as described herein, a policy provides one or more conditions that, if met, trigger an action (or actions). Example conditions can include: all vulnerable functions related to a given vulnerability have been actually executed, or, if no vulnerable functions have been executed, the smallest call distance between an application function and a vulnerable function is below a certain threshold. Example actions triggered by the policy evaluation can include interrupting periodic build processes, and/or the sending an alert.

Figure 5:
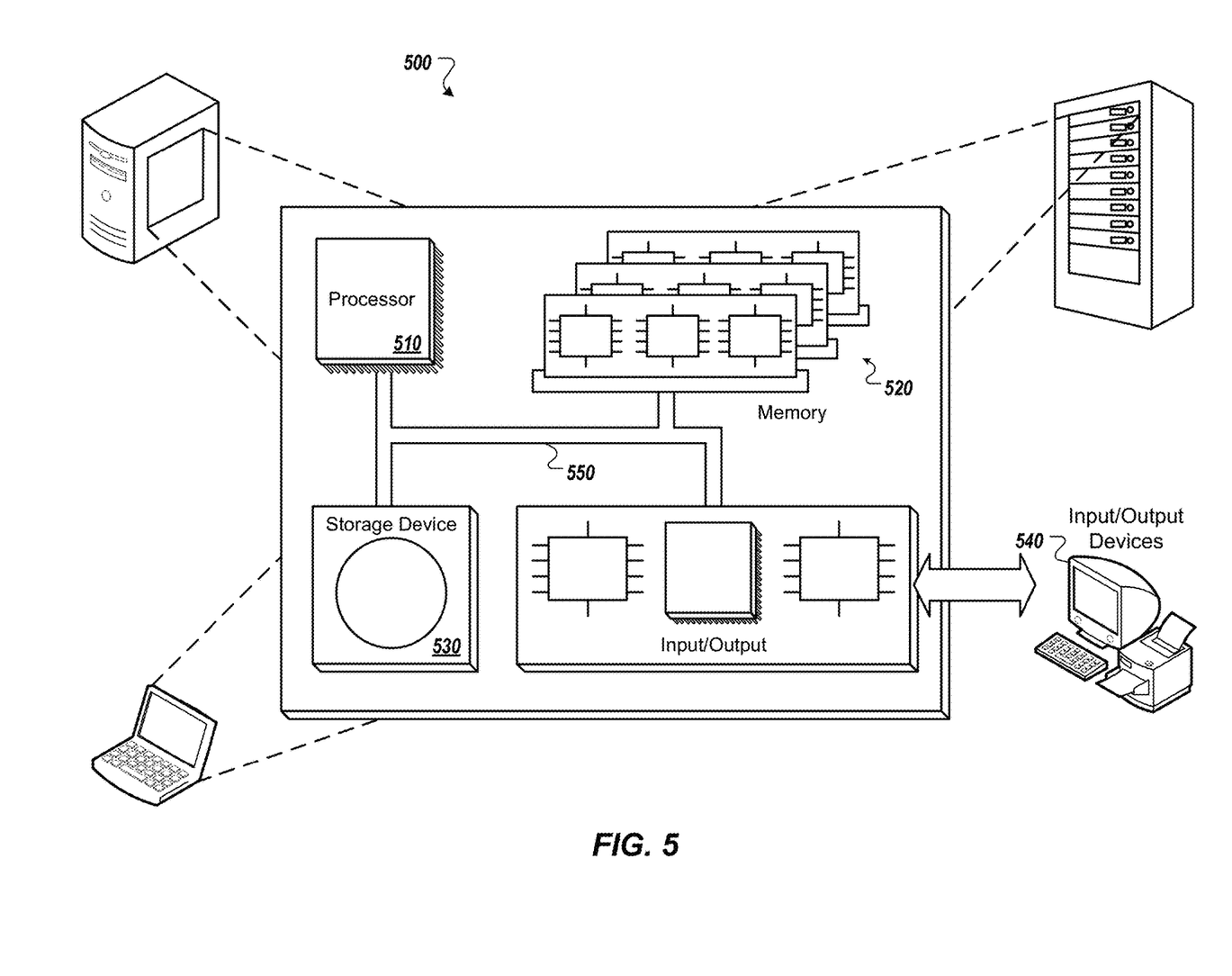
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for enhancing assessment of one or more known vulnerabilities inside one or more third-party libraries used within an application program that interacts with the one or more third-party libraries, the method being executed using one or more processors and comprising:
   receiving, by the one or more processors, a complete call graph that is provided by static source code analysis (SSCA) of the application program and any third-party libraries used by the application;
   receiving, by the one or more processors, one or more stack traces that are provided based on dynamic source code analysis (DSCA) during execution of the application program;
   processing, by the one or more processors, the complete call graph, the one or more stack traces, and vulnerable function data to provide one or more combined call graphs, the vulnerable function data identifying one or more vulnerable functions included in the one or more third-party libraries, each combined call graph being specific to a respective vulnerable function, the processing comprising:
   determining a unique identifier assigned to a vulnerable function from the vulnerable function data;
   providing a sub-call graph based on the unique identifier at least in part by searching from a node representing the vulnerable function backward within the complete call graph to identify one or more nodes representing functions of one or more of the third-party libraries and the application program to provide a sub-set of nodes from the complete call graph, the sub-set of nodes and relations between nodes defining the sub-call graph;
   identifying a stack trace associated with the unique identifier; and
   merging the stack trace with the sub-call graph to provide a combined call graph for the vulnerable function; and
   providing, by the one or more processors, a graphical representation of each combined call graph.

2. The method of claim 1, wherein each combined call graph comprises nodes and edges between nodes, at least one edge representing at least a portion of a stack trace and connecting a node representing a vulnerable function with a node representing a function.

3. The method of claim 2, wherein at least one node of the combined call graph represents one of a function, a package, and a file.

4. The method of claim 1, wherein each combined call graph comprises one or more annotations, at least one annotation indicating a name of one of a respective function and a respective package.

5. The method of claim 4, wherein at least one annotation indicates a metric determined for one of a respective function and a respective package.

6. The method of claim 1, further comprising:
   providing at least one metric based on information from one or more of SSCA and DSCA; and
   processing the metric based on a policy to selectively trigger an action provided in the policy.

7. A non-transitory computer-readable storage medium coupled to one or more processors and having instructions stored thereon which, when executed by the one or more processors, cause the one or more processors to perform operations for enhancing assessment of vulnerability of an application program based on call graphs, the operations comprising:
   receiving a complete call graph that is provided by static source code analysis (SSCA) of the application program and any third-party libraries used by the application;
   receiving one or more stack traces that are provided based on dynamic source code analysis (DSCA) during execution of the application program;
   processing the complete call graph, the one or more stack traces, and vulnerable function data to provide one or more combined call graphs, the vulnerable function data identifying one or more vulnerable functions included in the one or more third-party libraries, each combined call graph being specific to a respective vulnerable function, the processing comprising:
   determining a unique identifier assigned to a vulnerable function from the vulnerable function data;
   providing a sub-call graph based on the unique identifier at least in part by searching from a node representing the vulnerable function backward within the complete call graph to identify one or more nodes representing functions of one or more of the third-party libraries and the application program to provide a sub-set of nodes from the complete call graph, the sub-set of nodes and relations between nodes defining the sub-call graph;
   identifying a stack trace associated with the unique identifier; and merging the stack trace with the sub-call graph to provide a combined call graph for the vulnerable function; and
   providing a graphical representation of each combined call graph.

8. The computer-readable storage medium of claim 7, wherein each combined call graph comprises nodes and edges between nodes, at least one edge representing at least a portion of a stack trace and connecting a node representing a vulnerable function with a node representing a function.

9. The computer-readable storage medium of claim 8, wherein at least one node of the combined call graph represents one of a function, a package, and a file.

10. The computer-readable storage medium of claim 7, wherein each combined call graph comprises one or more annotations, at least one annotation indicating a name of one of a respective function and a respective package.

11. The computer-readable storage medium of claim 10, wherein at least one annotation indicates a metric determined for one of a respective function and a respective package.

12. The computer-readable storage medium of claim 7, wherein operations further comprise:
   providing at least one metric based on information from one or more of SSCA and DSCA; and
   processing the metric based on a policy to selectively trigger an action provided in the policy.

13. A system, comprising:
   a computing device; and
   a computer-readable storage device coupled to the computing device and having instructions stored thereon which, when executed by the computing device, cause the computing device to perform operations for enhancing assessment of vulnerability of an application program based on call graphs, the operations comprising:

receiving a complete call graph that is provided by static source code analysis (SSCA) of the application program and any third-party libraries used by the application;

receiving one or more stack traces that are provided based on dynamic source code analysis (DSCA) during execution of the application program;

processing the complete call graph, the one or more stack traces, and vulnerable function data to provide one or more combined call graphs, the vulnerable function data identifying one or more vulnerable functions included in the one or more third-party libraries, each combined call graph being specific to a respective vulnerable function, the processing comprising:

determining a unique identifier assigned to a vulnerable function from the vulnerable function data;

providing a sub-call graph based on the unique identifier at least in part by searching from a node representing the vulnerable function backward within the complete call graph to identify one or more nodes representing functions of one or more of the third-party libraries and the application program to provide a sub-set of nodes from the complete call graph, the sub-set of nodes and relations between nodes defining the subcall graph;

identifying a stack trace associated with the unique identifier; and merging the stack trace with the sub-call graph to provide a combined call graph for the vulnerable function; and providing a graphical representation of each combined call graph.

14. The system of claim 13, wherein each combined call graph comprises nodes and edges between nodes, at least one edge representing at least a portion of a stack trace and connecting a node representing a vulnerable function with a node representing a function.

15. The system of claim 14, wherein at least one node of the combined call graph represents one of a function, a package, and a file.

16. The system of claim 13, wherein each combined call graph comprises one or more annotations, at least one annotation indicating a name of one of a respective function and a respective package.

17. The system of claim 13, wherein operations further comprise:

providing at least one metric based on information from one or more of SSCA and DSCA; and processing the metric based on a policy to selectively trigger an action provided in the policy.

* * * * *